United States Patent
Beaupre et al.

(10) Patent No.: US 11,230,217 B2
(45) Date of Patent: Jan. 25, 2022

(54) DEVICE AND METHOD FOR DETERMINING CLEANLINESS OF A ROTATING DRUM OF A FRESH CONCRETE MIXER TRUCK

(71) Applicant: Command Alkon Incorporated, Birmingham, AL (US)

(72) Inventors: Denis Beaupre, Sainte-Catherine-de-la-Jacques (CA); Jerome Chapdelaine, Saint-Nicolas (CA)

(73) Assignee: COMMAND ALKON INCORPORATED, Birmingham, AL (US)

( * ) Notice: Subject to any disclaimer, the term of this patent is extended or adjusted under 35 U.S.C. 154(b) by 98 days.

(21) Appl. No.: 16/916,310

(22) Filed: Jun. 30, 2020

(65) Prior Publication Data

US 2021/0001765 A1 Jan. 7, 2021

Related U.S. Application Data

(60) Provisional application No. 62/869,699, filed on Jul. 2, 2019.

(51) Int. Cl.
*B28C 7/02* (2006.01)
*B28C 5/42* (2006.01)
*B60P 3/16* (2006.01)

(52) U.S. Cl.
CPC .............. *B60P 3/16* (2013.01); *B28C 5/422* (2013.01); *B28C 7/026* (2013.01)

(58) Field of Classification Search
CPC ..... B28C 5/422; B28C 5/4272; B28C 5/4237; B28C 5/4231; B28C 7/024; B28C 7/026; B28C 7/022; B28C 5/4217; B28C 5/4244; B28C 5/4268; B28C 5/18; B28C 5/42; B28C 7/16; B28C 5/4248; B28C 7/02; G01N 2011/0046; G01N 11/14; G01N 33/383; G01N 33/38; B60P 3/16
See application file for complete search history.

(56) References Cited

U.S. PATENT DOCUMENTS 10,940,610 B2 * 3/2021 Clifton .............. B01F 15/00201
2007/0247964 A1 * 10/2007 Ross ..................... B28C 5/4206
366/61

(Continued)

FOREIGN PATENT DOCUMENTS

WO 2011/046880 4/2011
WO 2017/072223 5/2017
WO 2019/020621 1/2019

*Primary Examiner* — Charles Cooley
(74) *Attorney, Agent, or Firm* — Wiley Rein LLP

(57) ABSTRACT

A method for determining cleanliness of a drum of a fresh concrete mixer truck. The method generally has: rotating the drum about the rotation axis with a constant torque; using a rotational speed sensor, measuring a plurality of speed values corresponding to speeds at which the drum rotates at different moments in time during said rotating; and using a controller, receiving the plurality of speed values; accessing calibration data having different reference speed values-related data associated to corresponding reference degrees of cleanliness of the drum; comparing at least some of the speed values to the calibration data; and determining a degree of cleanliness of the drum based on said comparison.

20 Claims, 13 Drawing Sheets

(56) References Cited

U.S. PATENT DOCUMENTS

| | | | |
|---|---|---|---|
| 2009/0171595 A1* | 7/2009 | Bonilla Benegas | B28C 7/02 |
| | | | 702/41 |
| 2017/0108421 A1* | 4/2017 | Beaupre | G01N 11/10 |
| 2019/0126510 A1* | 5/2019 | Roberts | G01M 1/16 |
| 2020/0078986 A1* | 3/2020 | Clifton | B01F 9/02 |
| 2020/0230841 A1* | 7/2020 | Datema | B28C 5/4248 |
| 2020/0230842 A1* | 7/2020 | Datema | B28C 5/422 |
| 2021/0001765 A1* | 1/2021 | Beaupre | B28C 5/422 |
| 2021/0162630 A1* | 6/2021 | Clifton | B01F 15/00201 |
| 2021/0229320 A1* | 7/2021 | Datema | B28C 5/421 |

\* cited by examiner

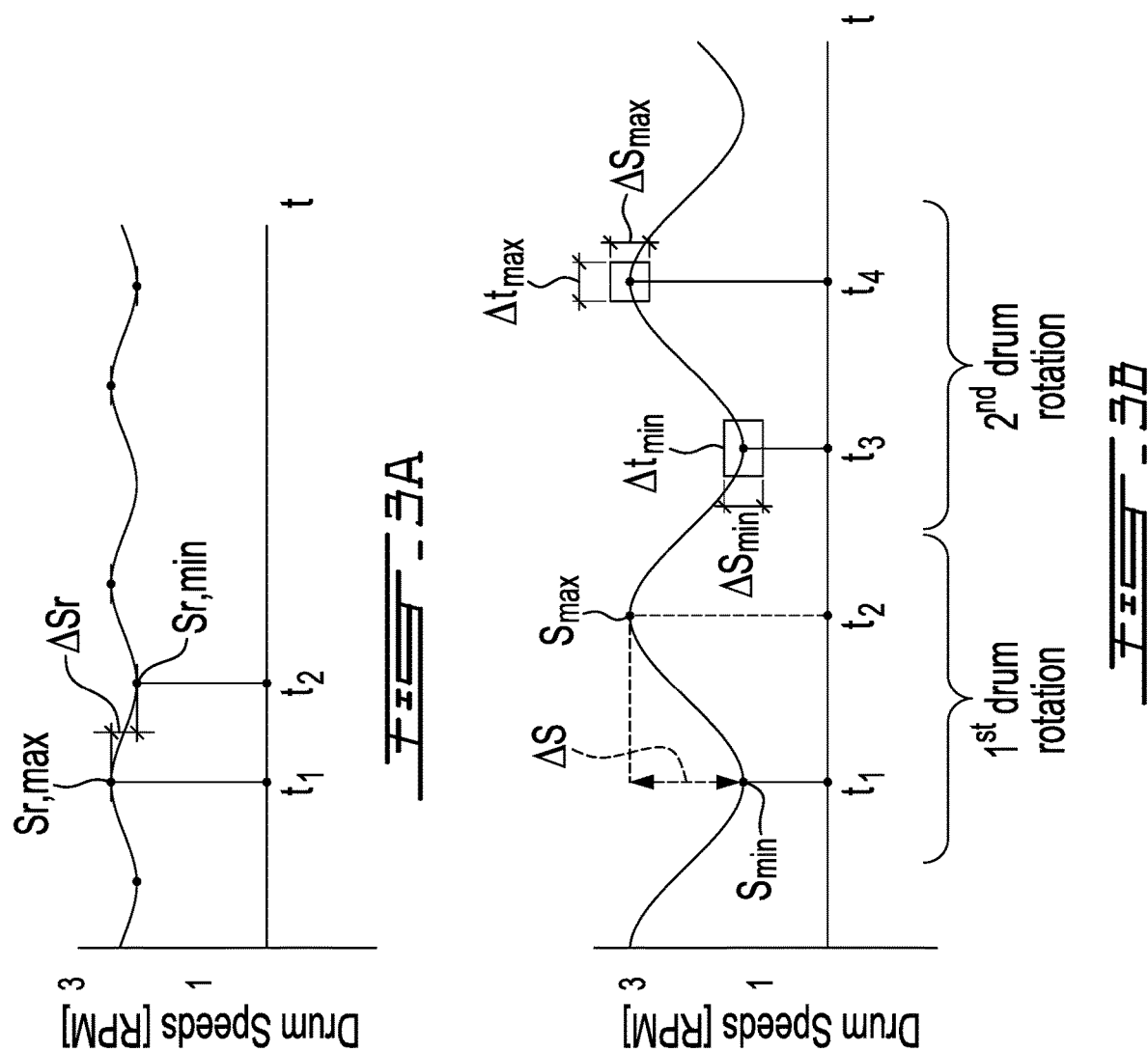

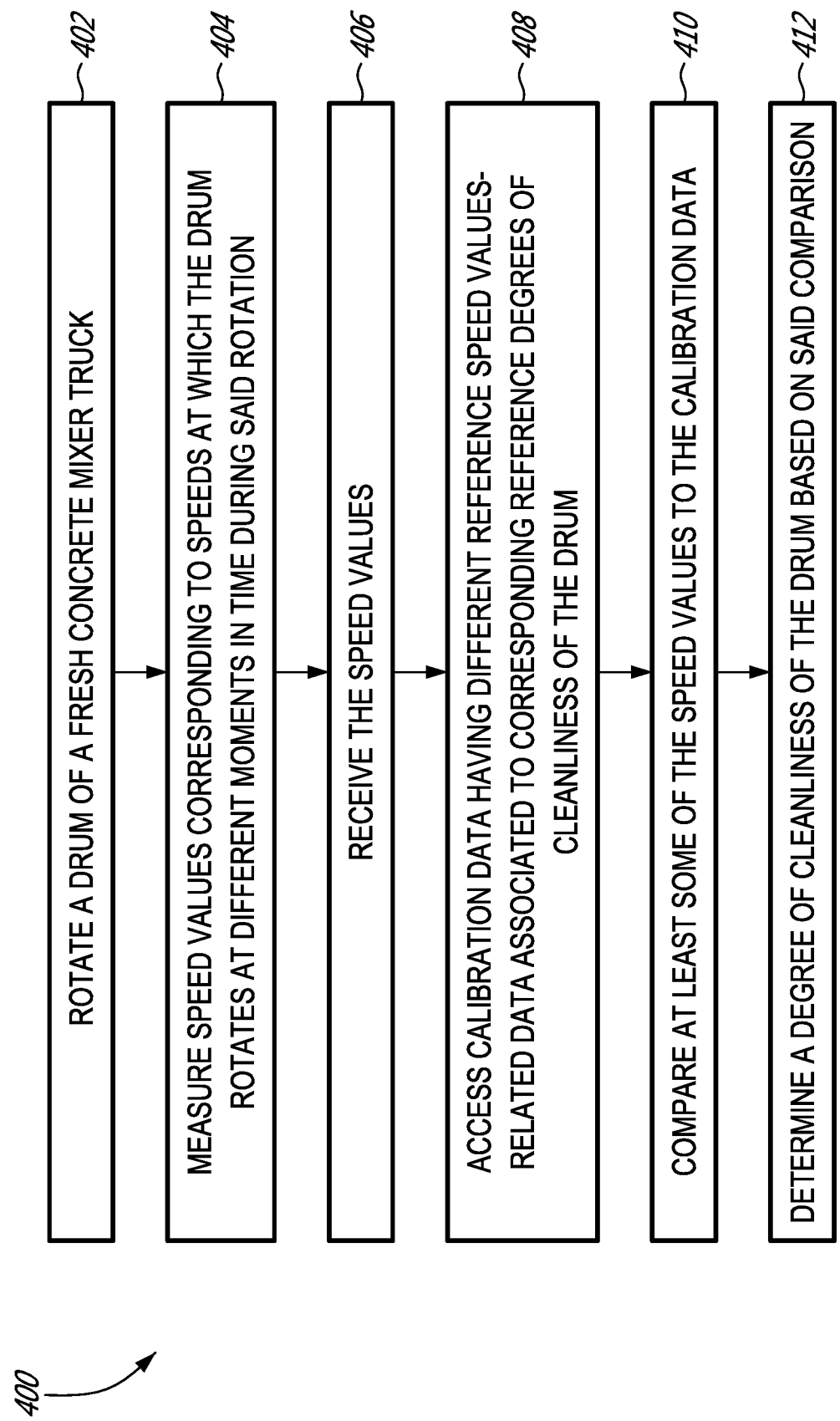

| REFERENCE DEGREE OF CLEANLINESS Cr% (ARB. UN.) | CALIBRATION DATA TABLE | | | | | | |
|---|---|---|---|---|---|---|---|
| | REFERENCE EXTREMA SPEED DIFFERENTIAL ΔSr (RPM) | | | | | | |
| NOMINAL TORQUE VALUE T (Nm) | ΔSr1 | ΔSr2 | ΔSr3 | ΔSr4 | ΔSr5 | ΔSr6 | |
| T1 | Cr1% | Cr8% | - | - | - | - | |
| T2 | Cr2% | Cr9% | - | - | - | - | |
| T3 | Cr3% | - | - | - | - | - | |
| T4 | Cr4% | - | - | - | - | - | |
| T5 | Cr5% | - | - | - | - | - | |
| T6 | Cr6% | - | - | - | - | - | |
| T7 | Cr7% | - | - | - | - | - | |

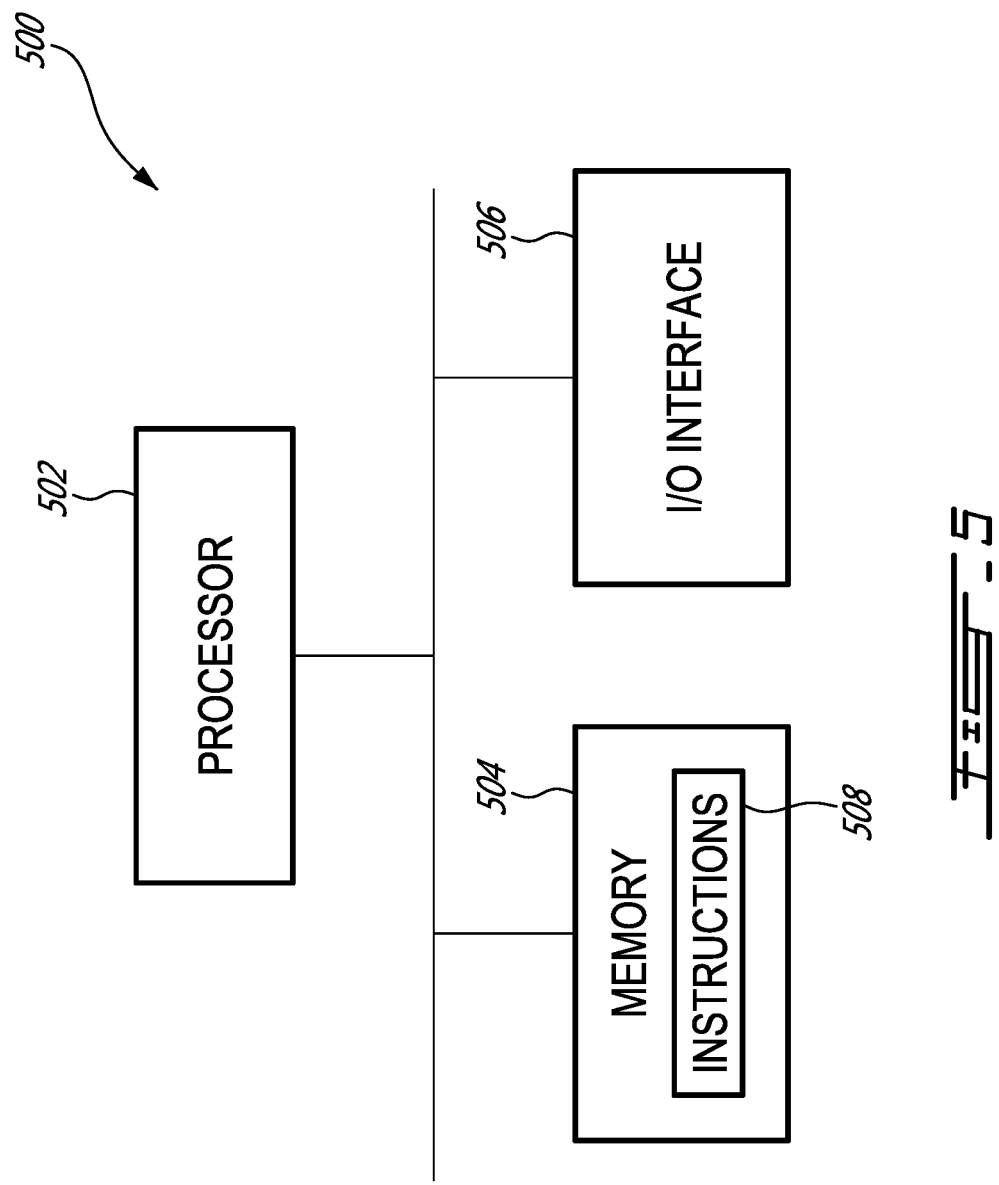

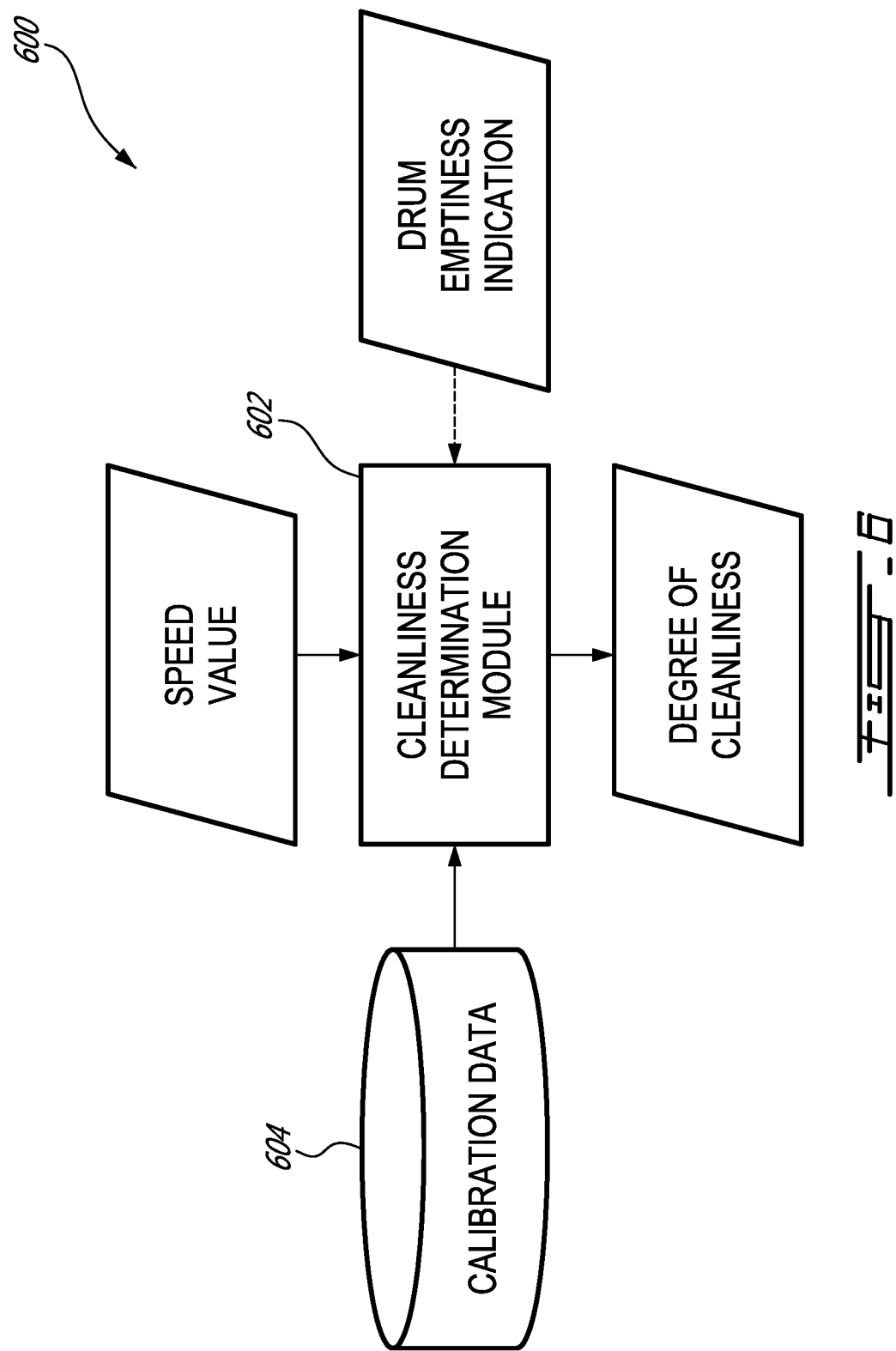

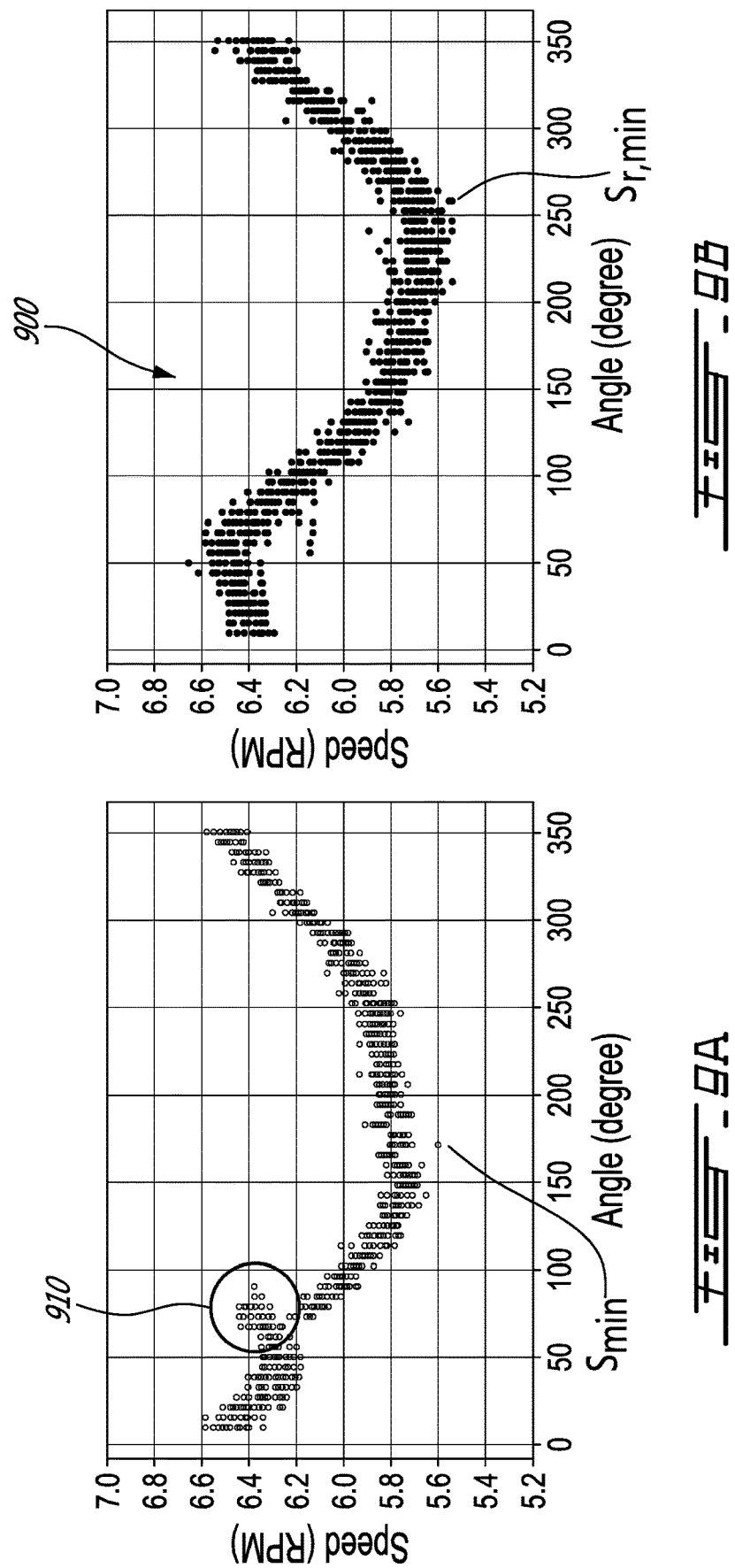

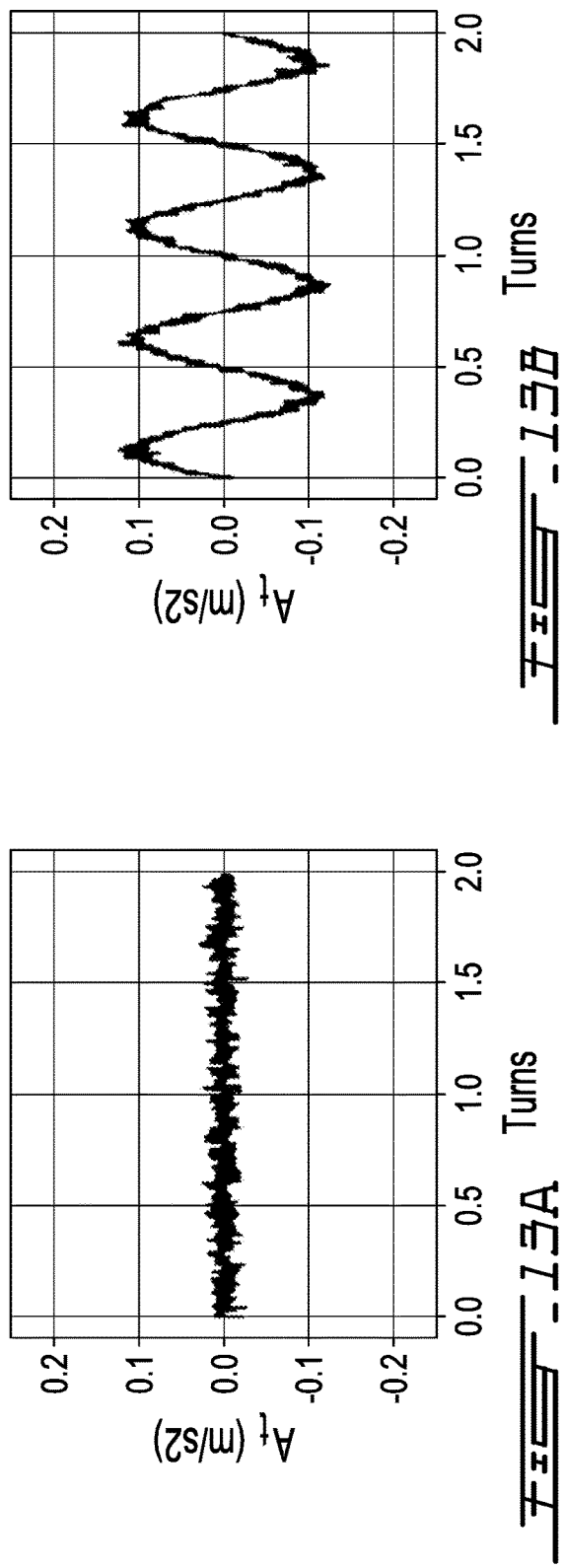
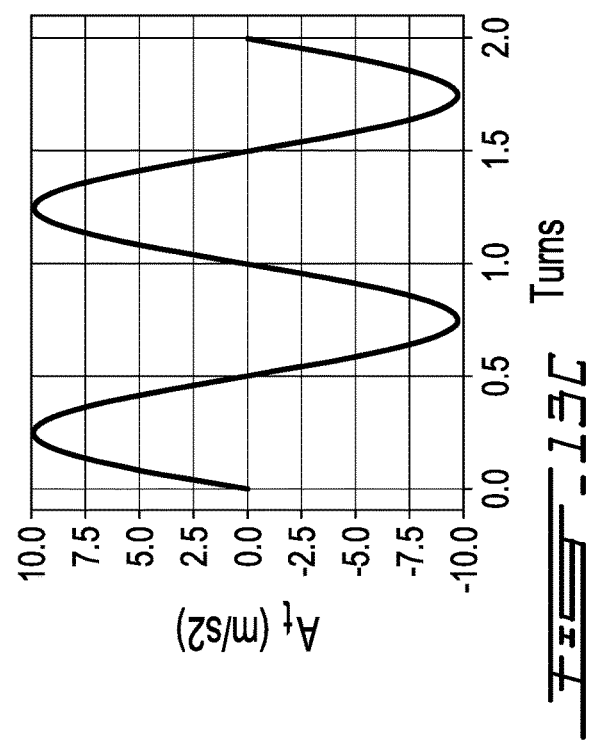
FIG-13A
FIG-13B
FIG-13C

DEVICE AND METHOD FOR DETERMINING CLEANLINESS OF A ROTATING DRUM OF A FRESH CONCRETE MIXER TRUCK

CROSS-REFERENCE TO RELATED APPLICATIONS

This application claims the benefit of U.S. provisional application No. 62/869,699, filed 2 Jul. 2019, which is hereby incorporated by reference as though fully set forth herein.

FIELD

The improvements generally relate to handling fresh concrete inside a rotating drum of a fresh concrete mixer truck, and more particularly relate to determining cleanliness of the rotating drum as the drum rotates.

BACKGROUND

Fresh concrete is formed of a mixture of ingredients including at least cement-based material and water in given proportions. The ingredients are typically transported inside a drum of a mixer truck where the fresh concrete can be mixed prior to being discharged at a job site.

To handle the fresh concrete, the drum generally has one or more spiraled blades that, depending on a direction of rotation of the spiraled blade, either mix the fresh concrete within the drum or force the fresh concrete towards a discharge outlet of the drum. Even if washed on a regular basis, some undischarged fresh concrete may harden against the interior surface of the drum or on the spiraled blades. Such fresh concrete hardening can occur when the discharge is delayed on the job site or when some parts of the mixer truck break, for instance. As the amount of hardened concrete stuck inside the drum and on the blades increases, the drum can be impaired in terms of mixing capacity and/or discharge performance. For instance, the hardened concrete can reduce the drum's internal volume which can lead to fresh concrete spillage during transit. Moreover, the hardened concrete can reduce the workability of the fresh concrete being discharged due to water being absorbed by the drier, undesired hardened concrete.

As it is difficult to predict when a drum will suffer from such hardened concrete-related issues, maintenance is regularly performed on the concrete mixer truck to evaluate the cleanliness of the drum and to remove any hardened concrete thereinside, should there be any. Some cleanliness techniques involve weighing the mixer truck under maintenance to detect any unusual weight increase. In some other techniques, a skilled operator can perform a visual evaluation of the cleanliness of the drum via the discharge outlet. Performing a visual evaluation through a hatch of the drum is also an option when the mixer truck is parked inside a workshop. Although existing drum cleanliness evaluation techniques have been found to be satisfactory to a certain degree, there remains room for improvement.

SUMMARY

It was found that there was a need for devices and methods for determining cleanliness of the drum of a mixer truck which alleviate at least some of the above-mentioned drawbacks.

In accordance with a first aspect of the present disclosure, there is provided a method for determining cleanliness of a drum of a fresh concrete mixer truck, the drum having a rotation axis, the method comprising: rotating the drum about the rotation axis with a constant torque; using a rotational speed sensor, measuring a plurality of speed values corresponding to speeds at which the drum rotates at different moments in time during said rotating; and using a controller, receiving the plurality of speed values; accessing calibration data having different reference speed values-related data associated to corresponding reference degrees of cleanliness of the drum; comparing at least some of the speed values to the calibration data; and determining a degree of cleanliness of the drum based on said comparison.

Further in accordance with the first aspect of the present disclosure, the method can for example comprise determining at least one of a maximal speed value and a minimal speed value among said plurality of speed values, said comparing including comparing the at least one of said maximal speed value and said minimal speed value to said calibration data.

Still further in accordance with the first aspect of the present disclosure, said reference speed values-related data can for example have at least one of a reference maximal speed value and a minimal speed value associated to the corresponding reference degrees of cleanliness of the drum, said comparing including comparing the at least one of said maximal speed value and said minimal speed value to said at least one of said reference maximal speed value and said minimal speed value.

Still further in accordance with the first aspect of the present disclosure, the method can for example further comprise determining an extrema speed differential indicative of a difference between a maximal speed value and a minimal speed value of said plurality of speed values, said comparing including comparing said extrema speed differential to said calibration data.

Still further in accordance with the first aspect of the present disclosure, said reference speed values-related data can for example have reference difference extrema speed differentials being indicative of a difference between reference maximal and minimal speed values and associated to the corresponding reference degrees of cleanliness of the drum.

Still further in accordance with the first aspect of the present disclosure, said rotating can for example be performed for a plurality of drum rotations, the plurality of speed values thereby oscillating between extrema speed values, wherein said determining is performed only upon determining that the extrema speed values associated to each of the plurality of drum rotations are equivalent to one another within a given tolerance.

Still further in accordance with the first aspect of the present disclosure, said plurality of drum rotations can for example be at least three drum rotations.

Still further in accordance with the first aspect of the present disclosure, said method can for example be performed upon receiving an indication that the drum is allegedly empty.

Still further in accordance with the first aspect of the present disclosure, said rotating can for example include rotating the drum at about one to three rotations per minute.

In accordance with a second aspect of the present disclosure, there is provided a device for determining cleanliness of a drum of a fresh concrete mixer truck, the fresh concrete mixer truck having a frame, a drum rotatably mounted to the frame for rotation about a rotation axis, and a driving device mounted to the frame driving rotation of the drum about the rotation axis, the device comprising: a rotational speed sensor measuring a plurality of speed values corresponding to speeds at which the drum rotates at different moments in time during a period of time within which the driving device drives rotation of the drum with a constant torque; and a controller communicatively coupled with the rotational speed sensor, the controller having a processor and a non-transitory memory having stored thereon instructions which when executed by the processor perform the steps of: receiving the plurality of speed values; accessing calibration data having different reference speed values-related data associated to corresponding reference degrees of cleanliness of the drum; comparing at least some of the speed values to the calibration data; and determining a degree of cleanliness of the drum based on said comparison.

Further in accordance with the second aspect of the present disclosure, the rotational speed sensor can for example have a rheological probe mounted inside the drum for measuring a plurality of pressure values indicative of pressure exerted onto the rheological probe as the drum rotates, the speed values being based on at least some of the pressure values measured by the rheological probe.

Still further in accordance with the second aspect of the present disclosure, said steps can for example be performed upon receiving an indication that the drum is allegedly empty, said indication being based on the measured pressure values.

Still further in accordance with the second aspect of the present disclosure, the rotational speed sensor can for example be at least one of an accelerometer and a gyroscope.

Still further in accordance with the second aspect of the present disclosure, the rotation speed sensor can for example be at least partially mounted to the drum.

Still further in accordance with the second aspect of the present disclosure, the controller can for example have a user interface receiving an indication that the drum is allegedly empty, said steps being performed upon receiving said indication.

In accordance with a third aspect of the present disclosure, there is provided a fresh concrete mixer truck comprising: a frame; a drum rotatably mounted to the frame, the drum having a rotation axis and a center of mass away from said rotation axis; a driving device mounted to the frame driving rotation of the drum about the rotation axis with a constant torque for a period of time; a rotational speed sensor measuring a plurality of speed values corresponding to speeds at which the drum rotates at different moments in time during said period of time; a controller communicatively coupled with the rotational speed sensor, the controller having a processor and a non-transitory memory having stored thereon instructions which when executed by the processor perform the steps of: receiving the plurality of speed values; accessing calibration data having different reference speed values-related data associated to corresponding reference degrees of cleanliness of the drum; comparing at least some of the speed values to the calibration data; and determining a degree of cleanliness of the drum based on said comparison.

In accordance with a fourth aspect of the present disclosure, there is provided a method for determining cleanliness of a drum of a fresh concrete mixer truck, the drum having a rotation axis, the method comprising: rotating the drum about the rotation axis with a constant torque; using an accelerometer, measuring a plurality of acceleration values corresponding to accelerations at which the fresh concrete mixer truck rocks in a lateral orientation perpendicular to said rotation axis and to a gravitational axis at different moments in time during said rotating; and using a controller, receiving the plurality of acceleration values; accessing calibration data having different reference acceleration values-related data associated to corresponding reference degrees of cleanliness of the drum; comparing at least some of the acceleration values to the calibration data; and determining a degree of cleanliness of the drum based on said comparison.

Further in accordance with the fourth aspect of the present disclosure, said accelerometer can for example be fixed relative to a frame of the fresh concrete mixer truck.

Still further in accordance with the fourth aspect of the present disclosure, said accelerometer can for example be fixed relative to the drum and rotating therewith.

Still further in accordance with the fourth aspect of the present disclosure, the accelerometer can for example be part of a rheological probe mounted to an inside wall of the drum.

Still further in accordance with the fourth aspect of the present disclosure, said measured accelerations can for example be tangential to a circular movement path of drum, said comparing including subtracting gravitational acceleration values to respective ones of the plurality of tangential acceleration values, the gravitational acceleration values being indicative of gravitational accelerations being experienced by said accelerometer as it rotates along the circular movement path.

In accordance with a fifth aspect of the present disclosure, there is provided a there is provided a method of determining calibration data for use in determining cleanliness of a drum of a fresh concrete mixer truck, the method comprising the steps of: unbalancingly rotating the drum about the rotation axis with a constant torque as the drum contains a given amount of concrete; using a rotational speed sensor, measuring a plurality of reference speed values corresponding to speeds at which the drum rotates at different moments in time during said rotating; establishing the calibration data by associating the reference speed values to a reference degree of cleanliness of the drum; and repeating said rotating, measuring and establishing for different amount of concrete inside the drum.

In accordance with a sixth aspect of the present disclosure, there is provided a method for determining cleanliness of a drum of a fresh concrete mixer truck, the drum unbalancingly rotating about a rotation axis with a constant torque, the method comprising: using a rotational speed sensor, measuring a plurality of speed values corresponding to speeds at which the drum rotates at different moments in time during said rotating; and using a controller, receiving the plurality of speed values; accessing calibration data having different reference speed values-related data associated to corresponding reference degrees of cleanliness of the drum; comparing at least some of the speed values to the calibration data; and determining a degree of cleanliness of the drum based on said comparison.

Many further features and combinations thereof concerning the present improvements will appear to those skilled in the art following a reading of the instant disclosure.

DESCRIPTION OF THE FIGURES

In the figures,

FIG. 3A is a graph showing speed value as a function of circumferential position of a drum rotating for a number of drum rotations when the drum is clean, in accordance with one or more embodiments;

FIG. 3B is a graph showing speed values as a function of circumferential position of a drum rotating for a number of drum rotations when the drum has concrete remaining thereinside, in accordance with one or more embodiments;

FIG. 4 is a flow chart of an example of a method for determining cleanliness of the drum of FIG. 2, in accordance with one or more embodiments;

FIG. 4A is a table showing exemplary calibration data associating reference speed values-related data to reference degrees of cleanliness, in accordance with one or more embodiments.

FIG. 5 is a schematic view of an example of a computing device of the controller of FIG. 1, in accordance with one or more embodiments;

FIG. 6 is a schematic view of an example of a software application of the controller of FIG. 1 being configured to perform the method of FIG. 5, in accordance with one or more embodiments;

FIG. 9A is a graph showing measured speed values as a function of circumferential position for a dirty drum rotating at a nominal speed of 6 RPM, in accordance with one or more embodiments;

FIG. 9B is a graph showing measured speed values as a function of circumferential position for a clean drum rotating at a nominal speed of 6 RPM, in accordance with one or more embodiments;

FIG. 13A is a graph showing lateral acceleration values as a clean drum rotates for a given number of turns, the lateral acceleration values being measured using the drum-based accelerometer of FIG. 11, in accordance with one or more embodiments;

FIG. 13B is a graph showing acceleration values as a dirty drum rotates for a given number of turns, the lateral acceleration values being measured using the drum-based accelerometer of FIG. 11, in accordance with one or more embodiments; and FIG. 13C is a graph showing gravitational acceleration values as a clean drum rotates for a given number of turns, the gravitational acceleration values being measured using the drum-based accelerometer of FIG. 11, in accordance with one or more embodiments.

DETAILED DESCRIPTION

Figure 1:
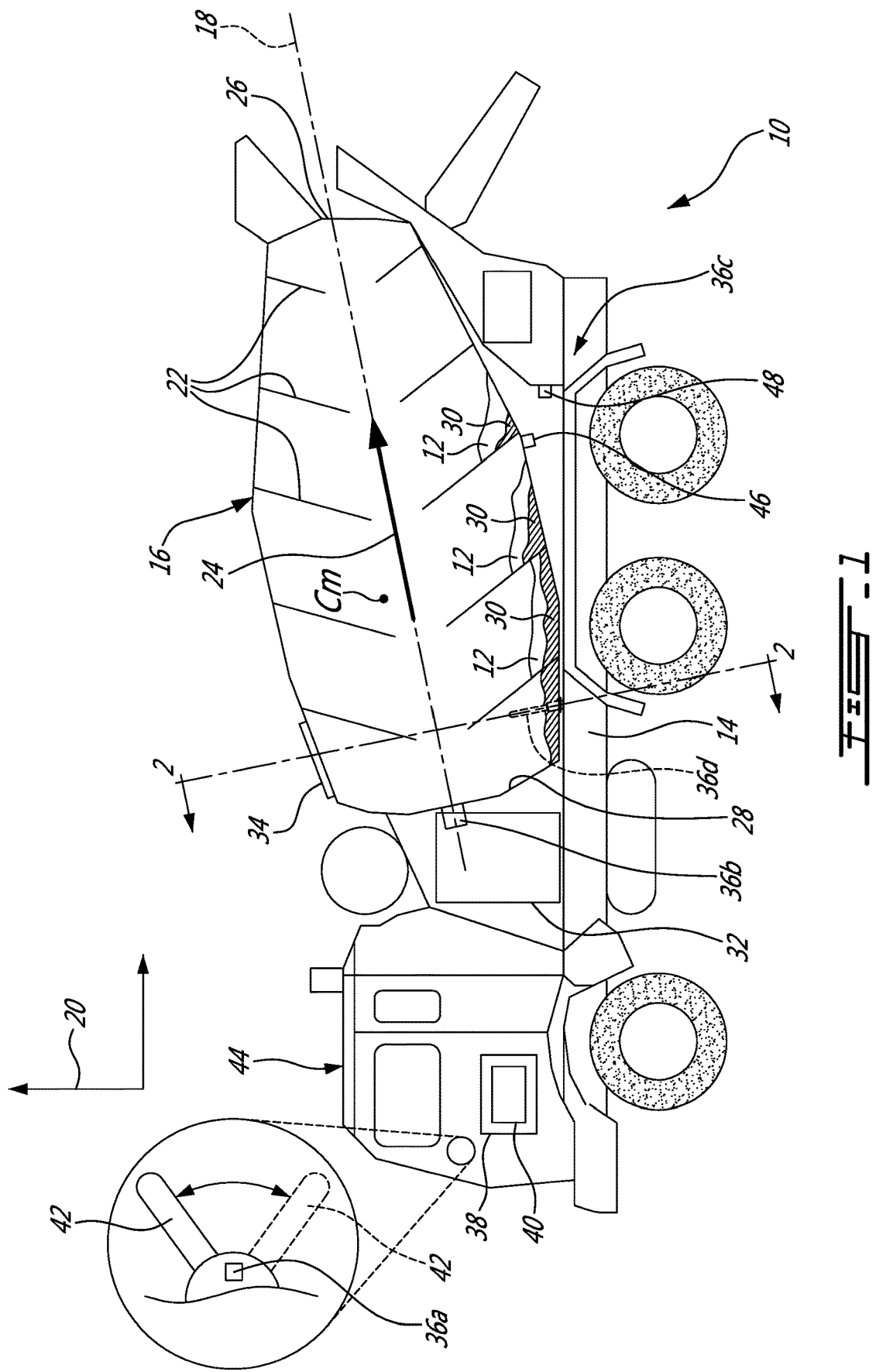
FIG. 1 is a side and sectional view of an example of fresh concrete mixer truck having a rotating drum, a driving device for driving rotation of the drum, a rotational speed sensor, and a controller, in accordance with one or more embodiments.

FIG. 1 shows an example of a fresh concrete mixer truck 10 (hereinafter referred to as "mixer truck 10") for handling fresh concrete 12. As shown, the mixer truck 10 has a frame 14 and a rotating drum 16 which is rotatably mounted to the frame 14. As such, the drum 16 can be rotated about a rotation axis 18 which is at least partially horizontally-oriented relative to the vertical 20.

As illustrated, the drum 16 has inwardly protruding blades 22 mounted inside the drum 16 which, when the drum 16 is rotated in an unloading direction, force the fresh concrete 12 along a discharge direction 24 towards a discharge outlet 26 of the drum 16 so as to be discharged at a job site. In contrast, when the drum 16 is rotated in a mixing direction, opposite to the unloading direction, the fresh concrete 12 is kept and mixed inside the drum 16.

In some embodiments, concrete constituents (e.g., cement, aggregate and water) are loaded in the drum 16 after which the drum 16 can be rotated a certain number of rotations in the mixing direction at a certain rotation speed so as to suitably mix the concrete constituents to one another, thus yielding the fresh concrete 12. In other embodiments, already mixed fresh concrete is loaded inside the drum 16, in which case the fresh concrete 12 can still be further mixed inside the drum 16 before discharge.

As mentioned above, after discharge of the fresh concrete 12, even if the interior of the drum 16 is thoroughly washed on a regular basis, some undischarged fresh concrete 12 may harden and form hardened concrete 30 against an interior surface 28 of the drum 16 or on against the spiraled blades 22. Such hardening of the fresh concrete 12 inside the drum 16 can occur when the discharge is delayed on the job site or when some parts of the mixer truck 10 break, for instance. As the amount of hardened concrete 30 stuck inside the drum 16 and on the blades 22 increases, the drum 16 can be impaired in terms of mixing capacity or discharge performance. For instance, the hardened concrete 30 can also reduce an internal volume of the drum 16 which can lead to spillage of the fresh concrete 12 during transit. Moreover, the hardened concrete 30 can reduce the workability of the fresh concrete 12 being discharged due to water being absorbed by the drier, undesired hardened concrete 30.

As shown, the mixer truck 10 has a driving device 32 mounted to the frame 14 for driving rotation of the drum 16. In this example, the driving device 32 is hydraulic and thus the rotation of the drum 16 is driven using a hydraulic fluid. The driving device 32 can be electrically powered, or powered in any other suitable manner, in some embodiments. The hydraulic fluid can be oil (e.g., mineral oil), water and the like. The driving device 32 exerts a torque on the drum 16, about the rotation axis 18 so as to rotate the drum 16 in any of the unloading and mixing directions. The torque exerted on the drum 16 by the driving device 28 can increase or decrease over time to accelerate or decelerate the rotation of the drum 16, as desired.

The mixer truck 10 has a controller 38 which is communicatively coupled at least with the driving device 32. The communication between the controller 38 and the driving device 32 can be provided by a wireless connection, a wired connection, or a combination thereof. In some embodiments, the torque applied on the drum 16 to drive its rotation can be controlled by the controller 38. Additionally or alternately, the torque applied on the drum 16 can be manually controlled by the driver using a hand lever.

In this specific embodiment, the mixer truck 10 has a user interface 40 which is communicatively coupled with the controller 38. As can be understood, the user interface 40 can be used to receive inputs and/or display data. Examples of inputs that can be received via the user interface 40 can include an instruction regarding the speed at which the drum 16 is to be rotated and the like. Examples of data that can be displayed by the user interface 40 can include the torque at which the driving device 32 currently drives rotation of the drum 16, the instantaneous speed of rotation of the drum 16 and the like. In some embodiments, the user interface 40 has a speed actuator 42 within a cabin 44 of the mixer truck 10. In these embodiments, the speed actuator 42 is actuatable to increase or decrease the rotational speed of the drum 16 by moving the speed actuator 42 up or down, as desired.

In a situation where the driving device 32 exerts what is expected to be a constant torque on the drum 16, i.e., while the speed actuator 42 is maintained at a constant position, the drum 16 is expected to rotate at a constant rotational speed. However, it was found that, as the drum 16 has a center of mass $C_M$ which is away from the rotation axis 18 of the drum 16, the rotation of the drum 16 is unbalanced. The center of mass $C_M$ can be offset relative to the rotation axis 18 for example due to the hardened concrete 30 that has most likely hardened in an unevenly distributed manner at the bottom of the drum 16 or on the inwardly protruding blades 22, or even due to circumferentially asymmetric components of the drum 16 such as hatch 34, an example of which being shown in FIGS. 1 and 2. Accordingly, the rotational speed of the drum 16 oscillates between extrema speed values including maximal and minimal speed values as the drum 16 rotates in such an unbalanced manner upon being driven with constant torque.

As best shown in FIG. 1, the mixer truck 10 has at least one rotational speed sensor 36 to monitor the rotational speed of the drum 16 as the drum 16 is unbalancingly rotated with an expected constant torque for a given period of time. More specifically, the rotational speed sensor 36 measures a plurality of speed values $S_i$ indicative of the speeds at which the drum 16 rotates during the given period of time, and generates a signal based on the measured speed values.

It is intended that at least a plurality of speed values are measured during each drum rotation so as to appreciate at least the maximal and minimal speed values of the drum 16 as it rotates unbalancingly about the rotation axis 18. Examples of the rotational speed sensor 36, including rotational speed sensors 36a, 36b, 36c and 36d, are described below. However, any suitable rotational speed sensor can be used.

The controller 38 is communicatively coupled with the rotational speed sensor 36. The communication between the controller 38 and the rotational speed sensor 36 can be provided by a wireless connection, a wired connection, or a combination thereof. As will be described below, the controller 38 determines a degree of cleanliness of the drum 16 upon processing the speed values $S_i$ measured by the rotational speed sensor 36, as will be described below. It is noted that the rotational speed sensor 36 and the controller 38 can be part of a device for determining cleanliness of a mixer truck's drum in some embodiments. The device can be installed on any suitable fresh concrete mixer truck to perform the methods disclosed herein.

Figure 2:
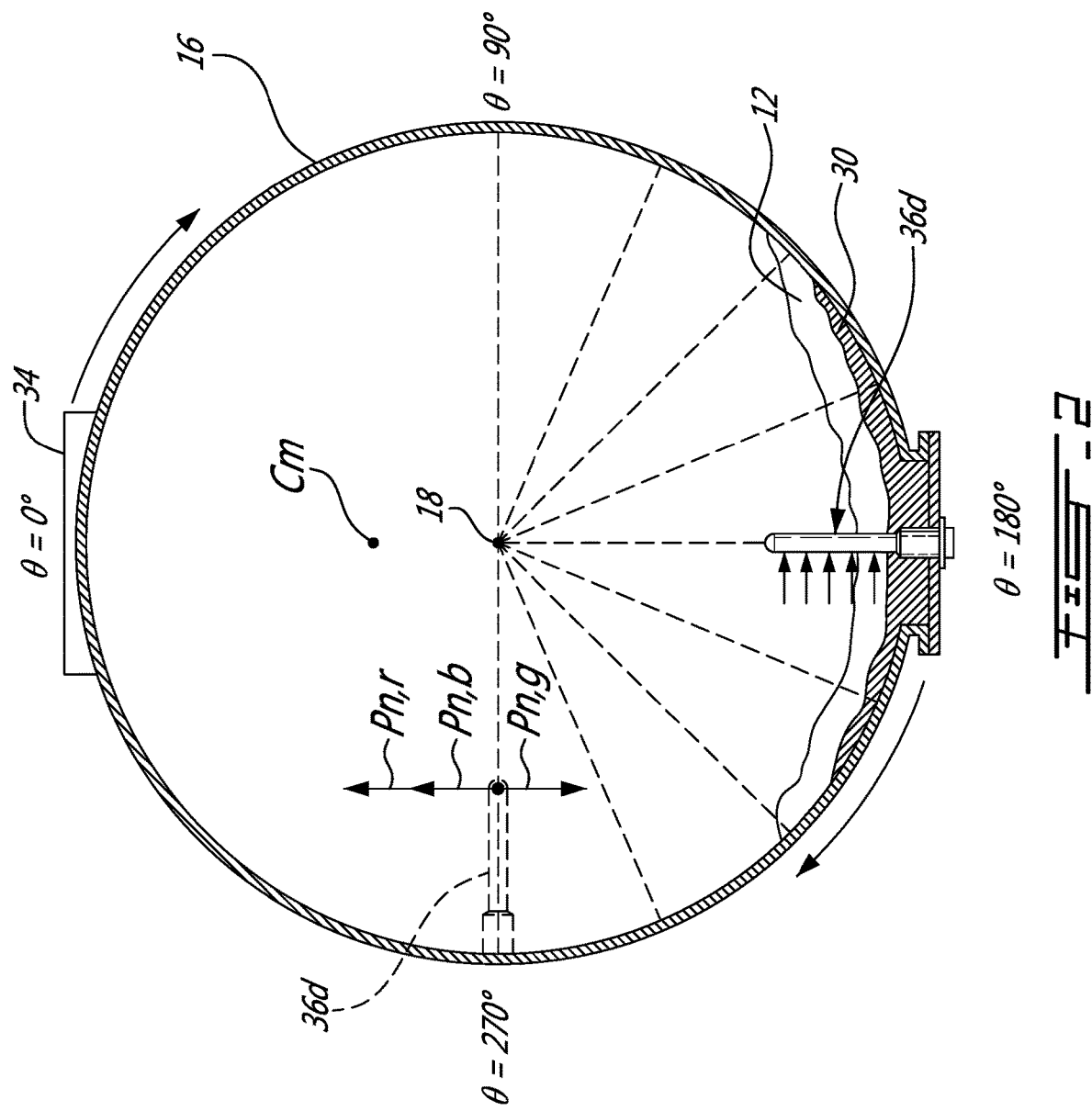
FIG. 2 is a sectional view taken along line 2-2 of FIG. 1, showing fresh concrete and hardened concrete remaining inside the drum at different circumferential positions of the drum, in accordance with one or more embodiments.

FIG. 3A shows speed values as a function of time as measured using a rotational speed sensor when a satisfactorily cleaned drum is unbalancingly rotated using a constant torque for a given period of time, whereas FIG. 3B shows speed values as a function of time as measured using a rotational speed sensor when a poorly cleaned drum, such as the one shown in FIG. 2, is unbalancingly rotated using the same constant torque. As the extrema speed values in these two cases will differ from one another based on the degree of cleanliness of the drum 16, it is suggested herein to determine a degree of cleanliness of the drum 16 based on a comparison between the speed values $S_i$ measured by the rotational speed sensor 36 and calibration data having different reference speed values-related data associated to corresponding reference degrees of cleanliness of the drum.

FIG. 4 shows an example of a method 400 for determining cleanliness of the drum 16 based on the speed values $S_i$ and on the calibration data discussed above. As can be understood, the method 400 can be performed by the controller 38 and is described with reference to the mixer truck 10 of FIG. 1 for ease of reading.

In some embodiments, the method 400 is initiated only upon receiving an indication that the drum 16 is empty, has been cleaned and/or when a confirmation of the actual degree of cleanliness of the drum 16 is sought. For instance, the method 400 can be performed on a regular basis, e.g., at the beginning of each work day, prior to sending the mixer truck 10 to maintenance and the like.

At step 402, the drum 16 is unbalancingly rotated about the rotation axis 18 with a constant torque T for a given period of time.

The torque with which the driving device 32 drives rotation of the drum 16 can be selected by a user via the speed actuator 42. However, in some other embodiments, the controller 38 instructs the driving device 32 to drive rotation of the drum 16 with a given torque when the step 402 is initiated. In some embodiments, the torque T with which the driving device 32 can be such that the drum 16 rotates between 1 rotation per minute (1 RPM) and 3 rotations per minute (3 RPM). However, in some other embodiments, the drum 16 may be rotated faster or slower than 1-3 RPM. In some embodiments, the rotational speed of the drum can also be expressed in terms of tangential linear speed.

At step 404, the rotational speed sensor 36 measure a plurality of speed values $S_i$ corresponding to speeds at which the drum 16 rotates at different moments in time $t_i$ during step 402, i denoting an integer.

It is intended that a plurality of speed values $S_i$ are measured during each drum rotation to appreciate the oscillating speed of the drum 16 rotating unbalancingly. In some embodiments, the speed values $S_i$ are measured over one drum rotation, preferably over two drum rotations (equivalently, drum turns) and most preferably over three drum rotations. However, in other embodiments, the speed values Si can be monitored over more than three drum rotations.

The speed values Si can be either evenly or unevenly distributed at each drum rotation. The sampling rate at which the speed values Si are measured can vary from one embodiment to another, however, in some embodiments; the sampling rate is preferably 100 measurements per second (100 Hz) and most preferably 50 measurements per second (50 Hz).

At step 406, the controller 38 receives the plurality of speed values Si. The speed values Si can be received directly from the rotational speed sensor 36. Otherwise, the speed values Si can be received from a memory system where the speed values Si may have been previously stored.

At step 408, the controller 38 accesses calibration data having different reference speed values-related data associated to corresponding reference degrees of cleanliness of the drum 16.

The calibration data are stored on a memory system accessible by the controller 38. In some embodiments, the calibration data provided in the form of one or more look-up tables, one or more graphs, one or more mathematical equations depending on the embodiment.

The reference speed values-related data can include reference extrema speed differentials $\Delta Sr$ indicative of differences between reference maximal and minimal reference speed values $Sr,max$ and $Sr,min$ among the speed values Si, .e., $\Delta Sr=Sr,max-Sr,min$. The reference speed values-related data can simply include reference maximal and minimal speed values $Sr,min$ and $Sr,max$. Other examples of the reference speed values-related data can be used.

The reference degrees of cleanliness of the drum 16 can be provided in the form of a percentage Cr % (e.g., 100%, 80%, 60%), a grade (e.g., A, B, C, D), status (e.g., drum is clean, drum is partially clean, drum is not clean). Other examples of the reference degrees of cleanliness can be used in some other embodiments.

At step 410, the controller 38 compares at least some of the speed values Si to the calibration data, and at step 412, the controller 38 determines a degree of cleanliness of the drum 16 based on the comparison performed at step 410.

In some embodiments, the controller 38 determines an extrema speed differential $\Delta S$ indicative of a difference between a maximal speed value Smax and a minimal speed value Smin of the speed values Si, i.e., $\Delta S=Smax-Smin=|Smin-Smax|$. In these embodiments, the step 410 includes a comparison between the extrema speed differential $\Delta S$ and the calibration data. When the reference speed values-related data are provided in the form of reference difference extrema speed differentials $\Delta S$, the controller 38 compares the extrema speed differential $\Delta S$ to the reference difference extrema speed differentials $\Delta Sr$, and then determines the degree of cleanliness of the drum based on this comparison. Examples of the measured and reference extrema speed differential $\Delta S$ and $\Delta Sr$ are illustrated in FIGS. 3A and 3B, respectively.

The calibration data can be dependent on the torque with which the drum 16 is being rotated using the driving device 32, thus yielding torque-dependent calibration data, an which being shown FIG. 4A. More specifically, FIG. 4A shows an example of calibration data where the degree of cleanliness of the drum is provided in the form of percentage and the reference extrema speed differentials also vary depending on the constant torque T with which the drum 16 is rotated when the speed values Si have been measured.

For example, if the controller 38 determines that the speed values Si have been measured using a constant torque T1, the controller 38 compares the measured extrema speed differential $\Delta S$ to the reference extrema speed differential $\Delta Sr,i$ associated to the constant torque T1 in this example. So, in this example, if the measured extrema speed differential $\Delta S$ corresponds to $\Delta S2$, then the controller 38 determines that the degree of cleanliness of the drum 16 corresponds to Cr8%.

The comparison does not need to involve a difference between the maximal and minimal speed values. Indeed, in some other embodiments, the controller 38 determines maximal and minimal speed values Smax and Smin among the speed values Si. In these embodiments, the step 410 includes a comparison between the maximal and minimal speed values Smax and Smin to the calibration data. When the reference speed values-related data have reference maximal and minimal speed values $Sr,min$ and $Sr,max$, the comparison is performed between either one or both of the maximal and minimal speed values Smax and Smin and either one or both of the reference maximal and minimal speed values $Sr,min$ and $Sr,max$.

In some embodiments, the drum 16 is unbalancingly rotated for a plurality of successive drum rotations, and the method 400 is performed only when the maximal speed value Smax, the minimal speed value Smin and/or the differential extrema speed value $\Delta S$ associated to each of the successive drum rotations are equivalent to one another within a given tolerance. This can be performed to ensure that the driving device 32 drives rotation of the drum 16 with a constant torque. As shown in FIG. 3B, the maximal and minimal speed values Smax and Smin associated of a first drum rotation and the maximal and minimal speed values Smax and Smin of a second drum rotation are equivalent to one another within a given tolerance. The tolerance can include a tolerance in the speed values, $\Delta Smax$ or $\Delta Smin$, or in the time $\Delta t$ or circumferential position $\Delta \theta$ at which these extrema speed values occurred.

The controller 38 can display the determined degree of cleanliness on the user interface 40. Additionally or alternately, the controller 38 can store the determined degree of cleanliness in a memory system and/or sent an alert indicating that the determined degree of cleanliness is below a given cleanliness threshold.

The controller 38 can be provided as a combination of hardware and software components. The hardware components can be implemented in the form of a computing device 500, an example of which is described with reference to FIG. 5. Moreover, the software components of the controller 38 can be implemented in the form of a software application, an example of which is described with reference to FIG. 6.

Referring to FIG. 5, the computing device 500 can have a processor 502, a memory 504, and I/O interface 506. Instructions 508 for performing the method 400 can be stored on the memory 504 and accessible by the processor 502.

The processor 502 can be, for example, a general-purpose microprocessor or microcontroller, a digital signal processing (DSP) processor, an integrated circuit, a field programmable gate array (FPGA), a reconfigurable processor, a programmable read-only memory (PROM), or any combination thereof.

The memory 504 can include a suitable combination of any type of computer-readable memory that is located either internally or externally such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like.

Each I/O interface 506 enables the computing device 500 to interconnect with one or more input devices, such as the rotational speed sensor 36, memory systems or remote networks on which are stored the calibration data and the like, or with one or more output devices such as the user interface 40 and the like.

Each I/O interface 506 enables the controller 38 to communicate with other components, to exchange data with other components, to access and connect to network resources, to serve applications, and perform other computing applications by connecting to a network (or multiple networks) capable of carrying data including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g. Wi-Fi, WiMAX), SS7 signaling network, fixed line, local area network, wide area network, and others, including any combination of these.

Referring now to FIG. 6, the software application 600 has a cleanliness determination module 602 which receives the speed values. The cleanliness determination module 602 accesses the calibration data that are stored on one or more databases 604 that are accessible to the cleanliness determination module 602. Then, the cleanliness determination module 602 compares at least some of the speed values to the calibration data such as described above and determines a degree of cleanliness that can be outputted towards a user interface, a network or one or more databases. In some embodiments, the software application 600 is stored on the memory 504 and accessible by the processor 502 of the computing device 500.

The computing device 500 and the software application 600 described above are meant to be examples only. Other suitable embodiments of the controller 38 can also be provided, as it will be apparent to the skilled reader.

Referring back to FIG. 1, although exemplary rotational speed sensor 36a, 36b, 36c and 36d are presented, any suitable type of rotational speed sensor can be used as the rotational speed sensor 36.

In some embodiments, the rotational speed sensor 36a measures the speed values based on measurements of the position of the speed actuator 42 that is located within a cabin 44 of the mixer truck 10 in this example.

In some embodiments, the rotational speed sensor 36b is provided in the form of a hydraulic pressure sensor mounted to the driving device 32 for measuring pressure values indicative of pressure of the hydraulic fluid as it is used to drive rotation of the drum 16. The speed values can thus be determined based on the pressure values measurements.

In some embodiments, the rotational speed sensor 36c includes a first transmitter 46 mounted to the rotating drum 16 and a second transmitter 48 stationary relative to the frame 14 of the mixer truck 10. In this example, either one of the first and second transmitters 46 and 48 transmits an electromagnetic signal over a wireless connection as the drum 16 rotates while the other one of the first and second transmitters 46 and 48 receive an oscillating signal originating from the electromagnetic signal. The speed values are determined based on the oscillating signal as the oscillating signal has a frequency indicative of the rotational speed of the rotating drum 16. An example of such rotational speed sensor is described in PCT application publication no. WO 2017/072223, the content of which is hereby incorporated by reference.

As depicted, the rotational speed sensor 36d is provided in the form of a rheological probe mounted inside the drum 16. The rotational speed sensor 36d has a base fixedly mounted inside the drum 16, an elongated body inwardly protruding towards the rotation axis 18, and a deformation sensor mounted to elongated body for providing pressure values indicative of the pressure exerted on the elongated body as the drum 16 rotates. The speed values are determined based on the pressure values as the pressure exerted on the elongated body has a gravitational component varying periodically as the drum 16 rotates. An example of such rotational speed sensor is described in PCT application publication no. WO 2011/046880, the content of which is hereby incorporated by reference.

More specifically, and referring specifically to FIG. 2, the rotational speed sensor 36d is at a circumferential position Θ of 0° when at the top of the drum 16, at a circumferential position of 90° when at the right of the drum 16, at a circumferential position of 180° when at the bottom of the drum 16, and at a circumferential position of 270° when at the left of the drum 16. Such definition of the circumferential positions Θ is exemplary only as the circumferential positions 9 could have been defined otherwise depending on the embodiment.

At each of the circumferential positions Θ, the rotational speed sensor 36d measures a pressure value and transmits the pressure value and the corresponding circumferential position Θ. The pressure values that are measured are oriented in a normal orientation with respect to the elongated body of the rotational speed sensor 36d. Such pressure values can be referred to as "normal pressure values" and can include a normal contribution $P_{n,g}$ imparted on the probe by gravity due to a weight of the probe and which varies as the drum 16 rotates. When the drum 16 is deemed to be empty, normal contributions $P_{n,b}$ and $P_{n,r}$ due to buoyancy and resistance are deemed to be null or insignificant so the normal contribution $P_{n,g}$ due to gravity is dominant. FIG. 2 shows normal contributions $P_{n,g}$, $P_{n,b}$, $P_{n,r}$ by way of force vectors acting on the probe when positioned at different circumferential positions. The gravity depends on a mass m of the probe and on the gravitational acceleration g, and acts on the rotational speed sensor 36d along the vertical 20. Accordingly, the normal contribution $P_{n,g}$ of the gravity exerted on the rotational speed sensor 36d varies with its circumferential position Θ. For instance, when the rotational speed sensor 36d is horizontally-oriented, e.g., when the rotational speed sensor 36d is at the circumferential position Θ=90° or Θ=270°, the normal contribution $P_{n,g}$ of the gravity is either maximal or minimal, as the gravity pulls the rotational speed sensor 36d towards the ground and creates a downward pressure on it. In contrast, when the rotational speed sensor 36d is vertically-oriented, e.g., when the rotational speed sensor 36d is at the bottom of the drum 16 so that its circumferential position is Θ=180°, the normal contribution $P_{n,g}$ of the gravity is null. The rotation speed at which the drum 16 is rotated can thus be measured using such a rheological probe even if the drum 16 is empty or near-empty, as discussed in PCT application publication no. WO 2019/020621, the content of which is hereby incorporated by reference.

In some embodiments, the method 400 described above is performed only when the drum 16 is determined to be empty, or allegedly empty as per an operator's instructions, for instance. The emptiness of the drum 18 can be monitored using the rheological probe acting as the rotational speed sensor 36d. In these embodiments, the method 400 is initiated when the rheological probe measures a lateral pressure below a given threshold value.

Other examples of the rotational speed sensor 36 can include, but not limited to, radar sensor(s), accelerometer(s), hydraulic pressure sensor(s), rheological probe(s), gyroscopic sensor(s), magnetic sensor(s), optical pick-up sensor(s) and the like.

Figure 7A:
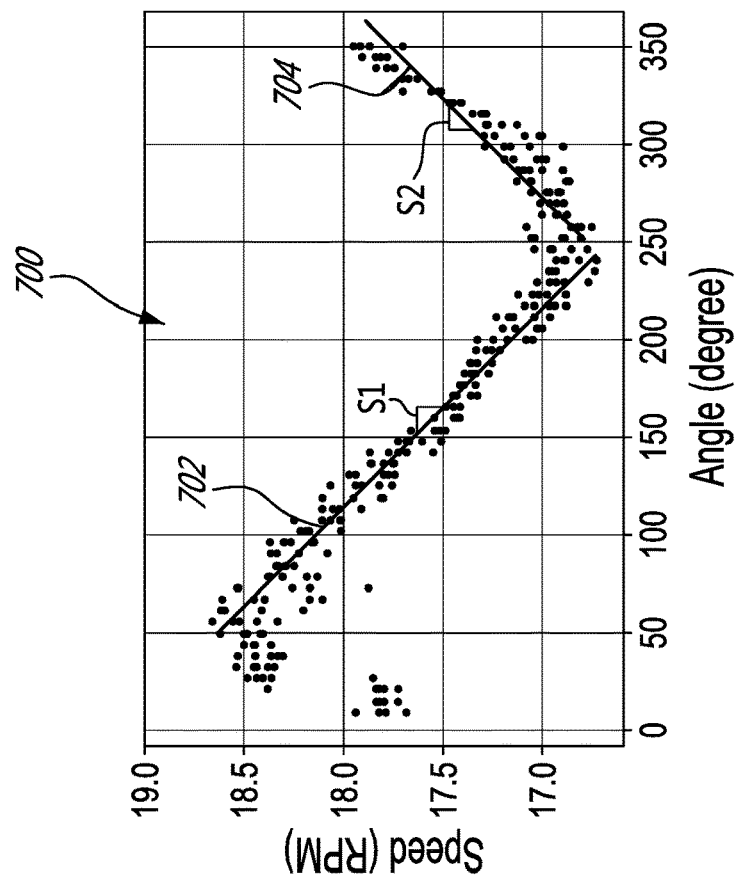
FIG. 7A is a graph showing measured speed values as a function of circumferential position for a dirty drum rotating at a nominal speed of 18 RPM, in accordance with one or more embodiments.
Figure 7B:
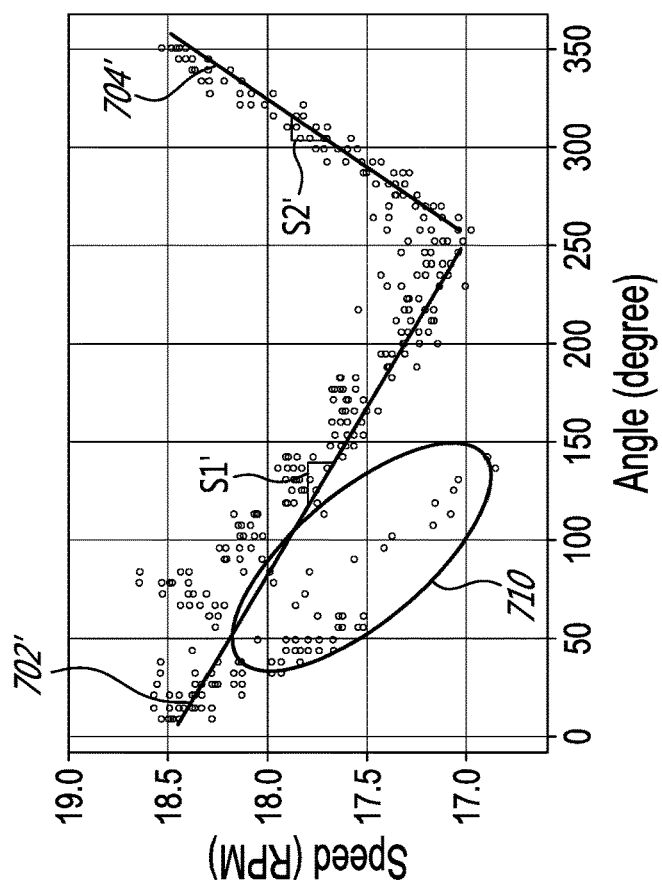
FIG. 7B is a graph showing measured speed values as a function of circumferential position for a clean drum rotating at a nominal speed of 18 RPM, in accordance with one or more embodiments.

FIG. 7A shows speed values measured at different circumferential positions for an allegedly empty drum rotating at a nominal speed of 18 RPM. FIG. 7B shows reference speed values as a function of circumferential position for the same drum rotating at the same nominal speed of 18 RPM. In this embodiment, the reference speed values of FIG. 7B are associated with a satisfactory degree of cleanliness, and can therefore be considered calibration data. In this specific example, the calibration data 700 include a downward curve portion 702 having a first slope S1 followed by an upward curve portion 704 with a second slope S2. With respect to FIG. 7A, the measured speed values show a downward curve portion 702' having a first slope S1' followed by an upward curve portion 704' with a second slope S2'. As depicted, example discrepancies 710 in the downward curve portion 702' of the measured speed values, more specifically lying between 40 degrees and 150 degrees can be identified. When compared to the calibration data of FIG. 7B, the discrepancies 710 can indicate that the allegedly empty drum does not have a satisfactory degree of cleanliness, i.e., that it is in fact at least partially dirty. In some embodiments, other forms of discrepancies can be identified in this comparison step as well. As such, differences between the downward curve portions 702 and 702', differences between the upward curve portions 704 and 704', differences the first slopes S1 and S1', differences the second slopes S2 and S2' are example indications that the degree of cleanliness of the allegedly empty drum does not match a satisfactory degree of cleanliness. For instance, a significant difference between the second slopes S2 and S2' may indicative that the allegedly empty drum rotates with some sort of unbalancing, which can in turn indicate that the drum is in fact neither clean nor empty. It is encompassed that other points of comparison between the measured and reference speed values can be used to determine whether the drum is clean.

Figure 8B:
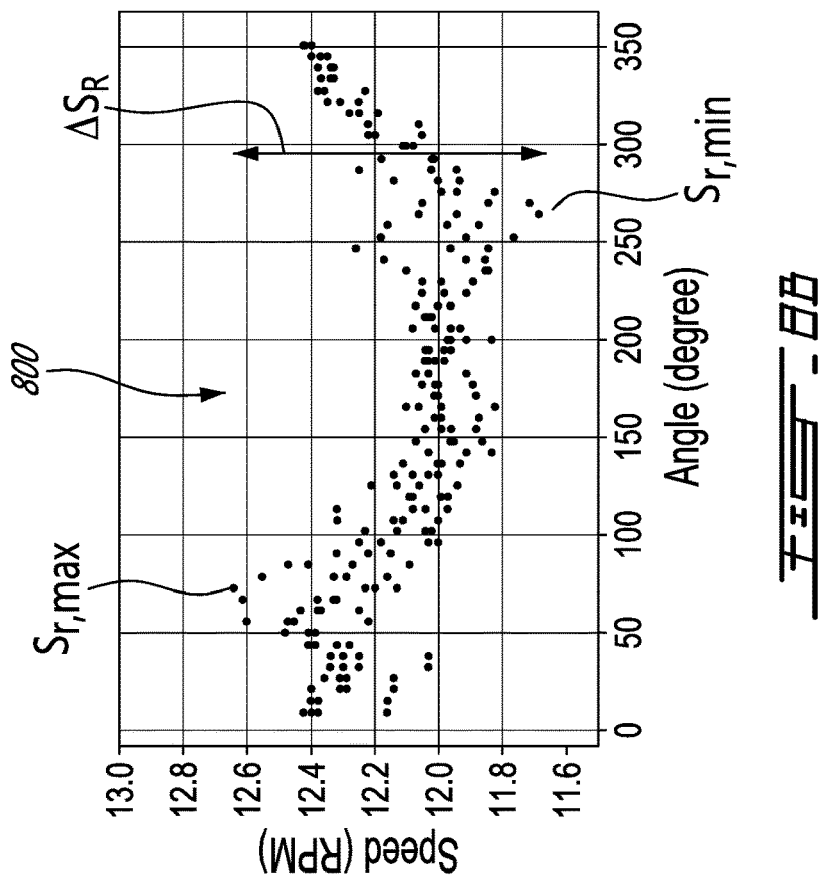
FIG. 8B is a graph showing measured speed values as a function of circumferential position for a clean drum rotating at a nominal speed of 12 RPM, in accordance with one or more embodiments.
Figure 8A:
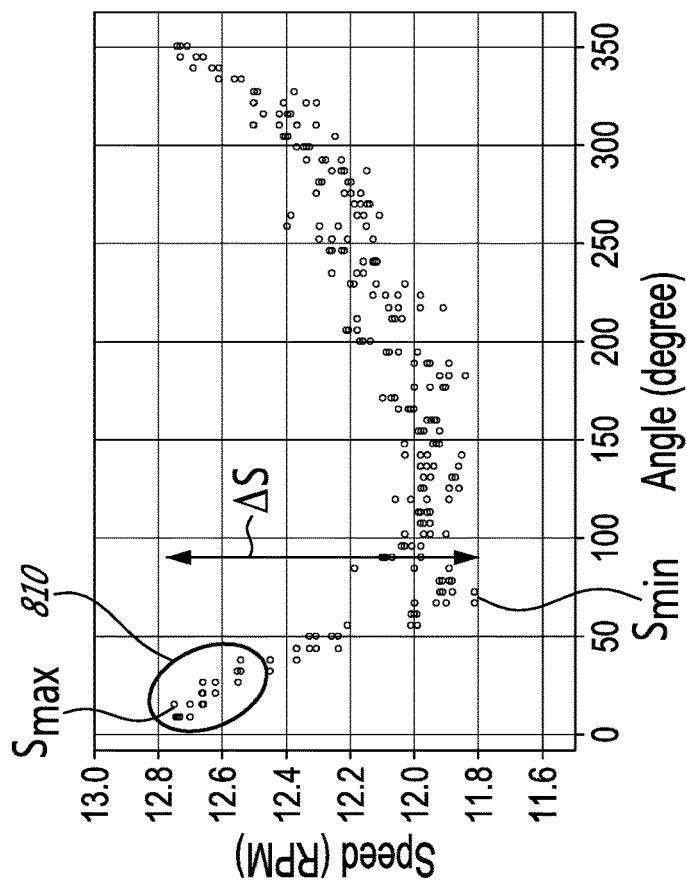
FIG. 8A is a graph showing measured speed values as a function of circumferential position for a dirty drum rotating at a nominal speed of 12 RPM, in accordance with one or more embodiments.

FIG. 8A shows speed values measured at different circumferential positions for an allegedly empty drum rotating at a nominal speed of 12 RPM. FIG. 8B shows reference speed values as a function of circumferential position for the same drum rotating at the same nominal speed of 12 RPM. In this embodiment, the reference speed values of FIG. 8B are associated with a satisfactory degree of cleanliness, and can therefore be part of some calibration data. In this specific example, the calibration data 800 shows reference maximal and minimal reference speed values $S_{r,max}$ and $S_{r,min}$ which are spaced apart by a given reference extrema speed differential $\Delta S_r$. It was found that the measured maximal and minimal speed values $S_{max}$ and $S_{min}$ and the extrema speed differential $\Delta S$ can be compared to the calibration data 800 to determine whether the allegedly empty drum is in fact empty. In this example, the extrema speed differential $\Delta S$ is greater than the reference extrema speed differential $\Delta S_r$, which can indicate that the drum is neither clean nor empty. Additionally or alternatively, discrepancies 810 where the measured speed values are greater than the corresponding reference speed values of the calibration data 800 may also indicate that the drum does not have a satisfactory degree of cleanliness. In some embodiments, the step of comparison can include identifying the circumferential positions of the maximal and minimal speed values $S_{max}$ and $S_{min}$ reached and comparing them to the calibration data 800. In this example, the reference minimal speed value $S_{r,min}$ is obtained at 260 degrees whereas the minimal speed value $S_{min}$ is obtained only at 60 degrees. Such a shift as well as other differences between the measured and reference speed values can be used in the comparing step.

FIG. 9A shows speed values measured at different circumferential positions for an allegedly empty drum rotating at a nominal speed of 6 RPM. FIG. 9B shows calibration data 900 comprising reference speed values as a function of circumferential position for the same drum rotating at the same nominal speed of 6 RPM. In this example, the measured minimal speed value $S_{min}$ is measured to be at 180 degrees whereas the reference minimal speed value $S_{r,min}$ is associated with 250 degrees. Such a shift in the circumferential position of the minimal speed values can be indicative that the drum does not possess a satisfactory degree of cleanliness. Moreover, discrepancies 910 in the continuity of the measured speed values can also be indicative that the allegedly empty drum is not satisfactorily clean or empty. It is envisaged that the degree of cleanliness of the drum can be determined regardless of the nominal speed at which it rotates. However, the features of the reference speed values which will be used in the step of comparing the measured speed values to the calibration data may change depending on that nominal speed.

It is noted that the measured and reference speed values are plotted in Cartesian coordinates in FIGS. 7A to 9B. However, in some other embodiments, the measured and reference speed values can be plotted or otherwise processed in polar coordinates, which can offer another visual representation useful to compare the measured data to the calibration data. For instance, the reference speed values may form an ellipse-like form when plotted in polar coordinates. As such, any discontinuity from such an ellipse-like form, e.g., an actual ellipse, in the measured speed values could indicate that the drum does not have a satisfactory degree of cleanliness.

In an aspect, it is noted that the fresh concrete mixer truck can have a 1- or 2-axis (or more) accelerometer mounted on the side of the drum to track its absolute position, then it may also possible to use the accelerometer's raw data to identify a misbalance in a drum in a way similar to a wheel balancing machine. Indeed, when a perfectly balanced drum rotates at a constant angular velocity, with a constant torque, the instantaneous acceleration measures are a result of the gravity and angle effect and the centrifugal acceleration only. If those gravity and centrifugal acceleration values are known and removed from the accelerometer readings, the remaining accelerations are due to various noise sources including lateral movements of the drum and truck. As such, a fresh concrete mixer truck will typically oscillate side-to-side when the drum is unbalanced and this will cause lateral accelerations on the sensors. Hence, there is proposed a method for determining cleanliness of a drum to take the readings of the accelerometers when they are in a horizontal position, remove any known accelerations (e.g., gravity, centrifugal, noise) and obtain a net acceleration directly related to the lateral accelerations from the drum imbalance.

Figure 10:
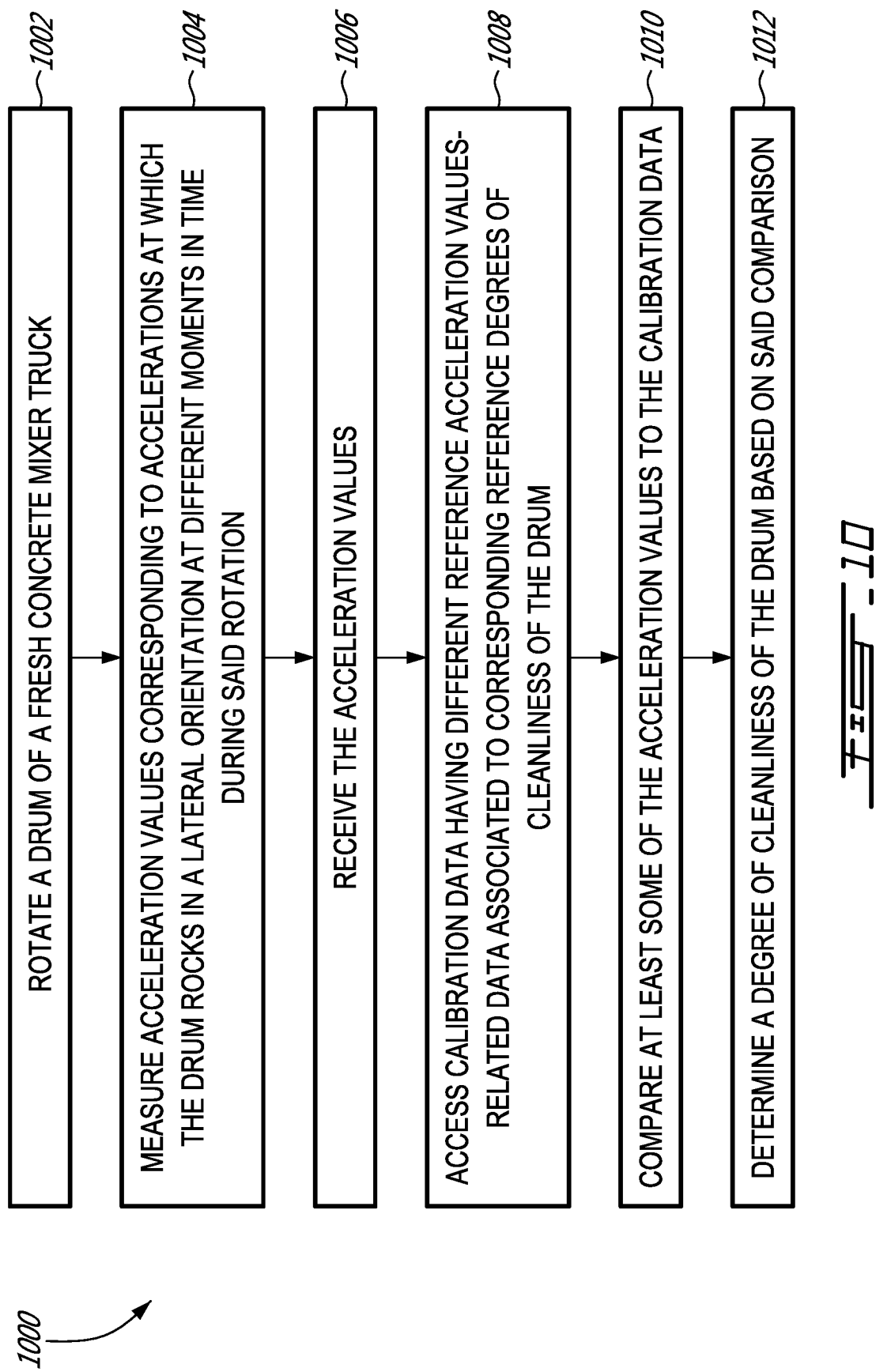
FIG. 10 is a flow chart of another example of a method for determining cleanliness of a drum, in accordance with one or more embodiments.

FIG. 10 shows a flowchart of another example method 1000 of determining cleanliness of a drum of a fresh concrete mixer truck. As can be understood, the method 1000 can be performed by a controller such as the one(s) described above.

In some embodiments, the method 1000 is initiated only upon receiving an indication that the drum is empty, has been cleaned and/or when a confirmation of the actual degree of cleanliness of the drum is sought. For instance, the method 1000 can be performed on a regular basis, e.g., at the beginning of each work day, prior to sending the mixer truck to maintenance and the like.

At step 1002, the drum is rotated about a rotation axis with a constant torque for a given period of time.

At step 1004, using one or more accelerometers, acceleration values Ai are measured at different moments in time ti during step 1002. The measured acceleration values correspond to accelerations at which the fresh concrete mixer truck rocks in back and forth along a lateral orientation which is both perpendicular to the rotation axis of the drum and to a gravitational axis. In other words, should the drum not be empty, unbalanced rotation of the drum will cause the fresh concrete mixer truck to rock between its left and right sides.

Figure 11:
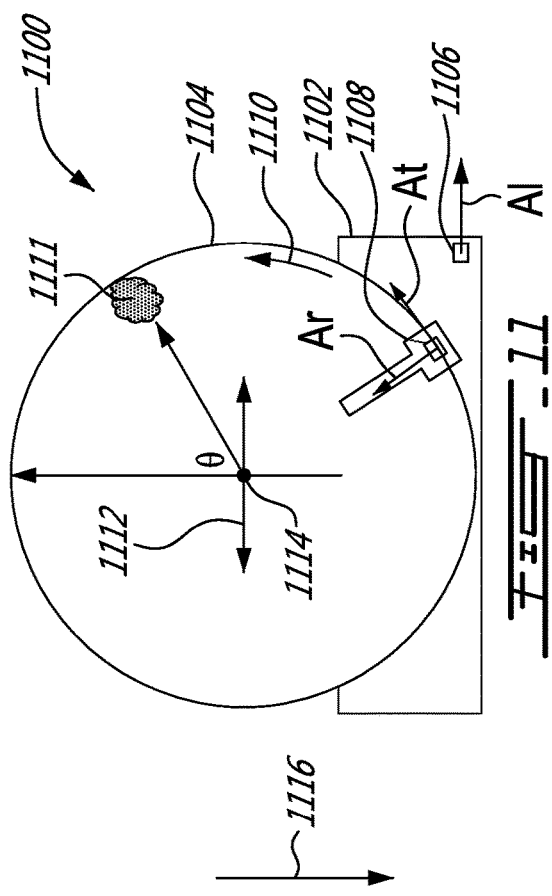
FIG. 11 is a sectional view of a fresh concrete mixer truck, showing a frame-based accelerometer and a drum-based accelerometer, in accordance with one or more embodiments.

Referring now to FIG. 11, an example fresh concrete mixer truck 1100 equipped with such accelerometer(s) is shown. As depicted, the fresh concrete mixer truck 1100 has a frame 1102 and a drum 1104 rotatably mounted to the frame 1102. In this specific example, the fresh concrete mixer truck 1100 has a first accelerometer 1106 which is fixed relative to the frame 1102. For instance, the first accelerometer 1106 is fixedly mounted to the frame 1102, and may be part of a cabin-based controller. A second accelerometer 1108 is also provided. As shown, the second accelerometer 1108 is fixed relative to the drum 1104 and rotates together with the drum 1104. In this specific example, the second accelerometer 1108 is part of a rheological probe 1110 which is mounted to an internal wall of the drum 1104. As can be appreciated, the first accelerometer 1106 and/or the second accelerometer 1108 can be used to perform the step 1004 of method 1000. More specifically, the first and second accelerometers 1106 and 1108 can measure accelerations at which the fresh concrete mixer truck 1100 rocks along a lateral orientation 1112 which is both perpendicular to the rotation axis 1114 of the drum and to a gravitational axis 1116. As can be understood, if fresh concrete 1111 remains within the drum 1104, its rotation will be unbalanced which will be measurable by the first and/or second accelerometers 1106 and 1108. As the first accelerometer 1106 measures acceleration occurring along the lateral orientation 1112 rather straightforwardly, the second accelerometer 110 measures acceleration occurring along the lateral orientation 1112 in addition to the gravitational and/or centrifugal accelerations which can be compensated for in a post-processing step, as described below.

Referring back to FIG. 10, at step 1006, the controller receives the measured acceleration values Ai, e.g., from either one or both of the first and second accelerometers 1106 and 1108.

At step 1008, the controller access calibration data having different reference acceleration values-related data associated to corresponding reference degrees of cleanliness of the drum.

At step 1010, the controller compares at least some of the acceleration values to the calibration data.

At step 1012, the controller determines a degree of cleanliness of the drum based on said comparison.

Figure 12B:
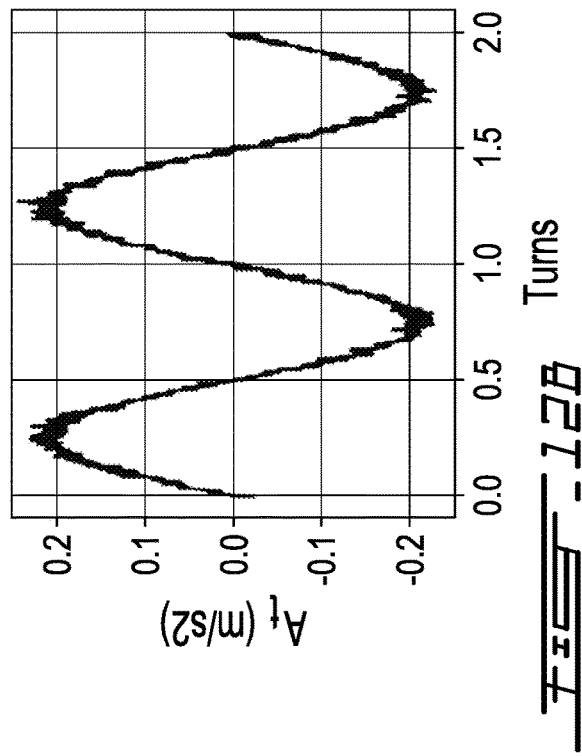
FIG. 12B is a graph showing lateral acceleration values as a dirty drum rotates for a given number of turns, the lateral acceleration values being measured using the frame-based accelerometer of FIG. 11, in accordance with one or more embodiments.
Figure 12A:
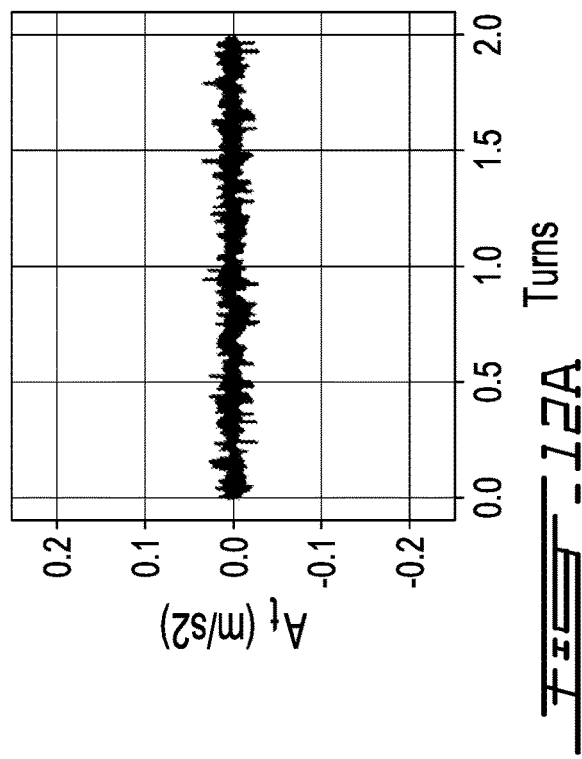
FIG. 12A is a graph showing lateral acceleration values as a clean drum rotates for a given number of turns, the lateral acceleration values being measured using the frame-based accelerometer of FIG. 11, in accordance with one or more embodiments.

FIGS. 12A and 12B show example reference and measured acceleration values measured using the first accelerometer 1106 of FIG. 11. As illustrated, FIG. 12A presents reference acceleration values that have been measured by the first accelerometer 1106 while the degree of cleanliness of the drum was satisfactory. The reference acceleration values of FIG. 12A indicate that the first accelerometer 1106 does not rock along the lateral orientation. Such a lack of lateral rocking is expected from a drum rotation about a rotation axis with a center of mass along the rotation axis. Should the drum be dirty, the center of mass would be off-axis, and accordingly the fresh concrete mixer truck would rock in back in forth along the lateral orientation as the drum rotates. FIG. 12B shows acceleration values that can be measured by the first accelerometer 1106 when the drum 1104 does not have a satisfactory degree of cleanliness. In some embodiments, the accelerometer 1106 is single-axis, and this axis is aligned along the lateral orientation. Accordingly, the gravitational acceleration is not detected by the first accelerometer 1106 as it is perpendicular to the lateral orientation.

In contrast with using an accelerometer fixed to the frame of the fresh concrete mixer truck, using an accelerometer rotating with the drum can add a challenge. Indeed, the gravitational and/or centrifugal acceleration(s) may need to be factored out of the raw accelerometer readings to obtain the lateral acceleration values.

In some embodiments, the second accelerometer 1108 can be single-axis, with the axis aligned along the tangential orientation. In these embodiments, the accelerometer readings include at least the gravitational acceleration and the lateral acceleration due to the unbalanced rotation of the drum, if the drum is dirty. In some other embodiments, the second accelerometer 1108 can be single-axis, with the axis aligned along the radial orientation. In these embodiments, the accelerometer readings include at least the gravitational acceleration, the centrifugal acceleration and the lateral acceleration due to the unbalanced rotation of the drum, if the drum is dirty. In some embodiments, the second accelerometer 1108 can be multi-axis, or there can be more than one drum-based accelerometer.

FIGS. 13A and 13B show example reference and measured acceleration values when using a second accelerometer 1108 which is aligned along the tangential orientation. As depicted, FIG. 13A shows reference acceleration values that have been measured by the second accelerometer 1108 while the degree of cleanliness of the drum was satisfactory, with the gravitational acceleration (see FIG. 13C) factored out. As shown, the reference acceleration values of FIG. 13A indicate that the second accelerometer 1108 does not rock along the lateral orientation during the rotation of the drum when the drum is clean. FIG. 13B shows acceleration values as measured using such an accelerometer when the rotation of the drum is unbalanced, i.e., when it is not clean. As can be seen, the lateral acceleration oscillates between 0.12 m/s$^2$ and 0.12 m/s$^2$ in this specific embodiment, which can be indicate that the truck rocks or moves laterally during the rotation of the drum and that therefore the drum is not clean.

As can be understood, the examples described above and illustrated are intended to be exemplary only. For instance, the controller can have a part within the rotational speed sensor and a part remote from the rotational speed sensor. In this way, the controller may always receive the plurality of speed values, even if the speed values are filtered within the rotational speed sensor, i.e., by the part of the controller that lies within the rotational speed sensor. The scope is indicated by the appended claims.

What is claimed is:

1. A method for determining cleanliness of a drum of a fresh concrete mixer truck, the drum having a rotation axis, the method comprising:

rotating the drum about the rotation axis with a constant torque;

using a rotational speed sensor, measuring a plurality of speed values corresponding to speeds at which the drum rotates at different moments in time during said rotating; and using a controller,
receiving the plurality of speed values;
accessing calibration data having different reference speed values-related data associated to corresponding reference degrees of cleanliness of the drum;
comparing at least some of the speed values to the calibration data; and
determining a degree of cleanliness of the drum based on said comparison.

2. The method of claim 1 further comprising determining at least one of a maximal speed value and a minimal speed value among said plurality of speed values, said comparing including comparing the at least one of said maximal speed value and said minimal speed value to said calibration data.

3. The method of claim 2 wherein said reference speed values-related data have at least one of a reference maximal speed value and a minimal speed value associated to the corresponding reference degrees of cleanliness of the drum, said comparing including comparing the at least one of said maximal speed value and said minimal speed value to said at least one of said reference maximal speed value and said minimal speed value.

4. The method of claim 1 wherein further comprising determining an extrema speed differential indicative of a difference between a maximal speed value and a minimal speed value of said plurality of speed values, said comparing including comparing said extrema speed differential to said calibration data.

5. The method of claim 4 wherein said reference speed values-related data have reference difference extrema speed differentials being indicative of a difference between reference maximal and minimal speed values and associated to the corresponding reference degrees of cleanliness of the drum.

6. The method of claim 1 wherein said rotating is performed for a plurality of drum rotations, the plurality of speed values thereby oscillating between extrema speed values, wherein said determining is performed only upon determining that the extrema speed values associated to each of the plurality of drum rotations are equivalent to one another within a given tolerance.

7. The method of claim 6 wherein said plurality of drum rotations is at least three drum rotations.

8. The method of claim 1 wherein said method is performed upon receiving an indication that the drum is allegedly empty.

9. The method of claim 1 wherein said rotating includes rotating the drum at about one to three rotations per minute.

10. A device for determining cleanliness of a drum of a fresh concrete mixer truck, the fresh concrete mixer truck having a frame, a drum rotatably mounted to the frame for rotation about a rotation axis, and a driving device mounted to the frame driving rotation of the drum about the rotation axis, the device comprising:

a rotational speed sensor measuring a plurality of speed values corresponding to speeds at which the drum rotates at different moments in time during a period of time within which the driving device drives rotation of the drum with a constant torque; and a controller communicatively coupled with the rotational speed sensor, the controller having a processor and a non-transitory memory having stored thereon instructions which when executed by the processor perform the steps of:
receiving the plurality of speed values;
accessing calibration data having different reference speed values-related data associated to corresponding reference degrees of cleanliness of the drum;
comparing at least some of the speed values to the calibration data; and
determining a degree of cleanliness of the drum based on said comparison.

11. The device of claim 10 wherein the rotational speed sensor has a rheological probe mounted inside the drum for measuring a plurality of pressure values indicative of pressure exerted onto the rheological probe as the drum rotates, the speed values being based on at least some of the pressure values measured by the rheological probe.

12. The device of claim 11 wherein said steps are performed upon receiving an indication that the drum is allegedly empty, said indication being based on the measured pressure values.

13. The device of claim 11 wherein the rotational speed sensor is at least one of an accelerometer and a gyroscope.

14. The device of claim 11 wherein the rotational speed sensor is at least partially mounted to the drum.

15. The device of claim 11 wherein the controller has a user interface receiving an indication that the drum is allegedly empty, said steps being performed upon receiving said indication.

16. A method for determining cleanliness of a drum of a fresh concrete mixer truck, the drum having a rotation axis, the method comprising:

rotating the drum about the rotation axis with a constant torque;

using an accelerometer, measuring a plurality of acceleration values corresponding to accelerations at which the fresh concrete mixer truck rocks in a lateral orientation perpendicular to said rotation axis and to a gravitational axis at different moments in time during said rotating; and using a controller,
receiving the plurality of acceleration values;
accessing calibration data having different reference acceleration values-related data associated to corresponding reference degrees of cleanliness of the drum;
comparing at least some of the acceleration values to the calibration data; and
determining a degree of cleanliness of the drum based on said comparison.

17. The method of claim 16 wherein said accelerometer is fixed relative to a frame of the fresh concrete mixer truck.

18. The method of claim 16 wherein said accelerometer is fixed relative to the drum and rotates therewith.

19. The method of claim 18 wherein the accelerometer is part of a rheological probe mounted to an inside wall of the drum.

20. The method of claim 18 wherein said measured accelerations are tangential to a circular movement path of the drum, said comparing including subtracting gravitational acceleration values to respective ones of the plurality of tangential acceleration values, the gravitational acceleration values being indicative of gravitational accelerations being experienced by said accelerometer as it rotates along the circular movement path.

* * * * *